UNITED STATES PATENT OFFICE.

GEORGE L. OWENS, OF SIOUX CITY, IOWA.

BLOCK FOR LIVE STOCK.

1,229,317.  Specification of Letters Patent.  Patented June 12, 1917.

Application filed January 20, 1917. Serial No. 143,487.

*To all whom it may concern:*

Be it known that I, GEORGE L. OWENS, a citizen of the United States, and a resident of Sioux City, in the county of Woodbury and State of Iowa, have invented certain new and useful Improvements in Blocks for Live Stock, of which the following is a specification.

The present invention aims to provide a condition block for live stock.

It has long been a common practice to administer condition medicine to live stock by mixing salt with the medicine, the salt being so proportioned to the medicine that the animals in partaking of sufficient of the salt to satisfy their natural craving therefor, would also take therewith the quantity of medical material desired to be administered.

These mixtures were generally in powdered form; although sometimes solutions were used. It is more desirable to make the mixture in the form of a solid mass which the animals can lick rather than to use it as a solution or as a powder. The latter forms are apt to create waste and permit the entrance of foreign matter. With a solid mass or block, consumption by the stock is slow and regular; and it is practically impossible for an animal to over-eat or consume a dangerous amount. Using a solid block of the proper kind the stock may be given free access to such a block without danger of injury.

Much difficulty has been experienced, however, in producing these compositions in solid blocks or masses which are soluble and yet will not disintegrate, without importing into the composition some inert binding material.

In some instances in order to form a solid block cement or other inert materials, as clay, has been employed but these substances are indigestible and may be harmful.

Moreover, the medicated clay brick, after being subjected to pressure to expel the bulk of the water therefrom, must be baked, as the patentee states, the evaporating process tends to deteriorate the quality and evaporate the properties of the medicines contained therein leaving principally the inert, indigestible residue behind.

The primary object, therefore, of the present invention, is the production of an improved condimental medicated block avoiding the above-recited disadvantages and obtaining certain new advantages.

A still further object of the invention is the production of an improved soluble digestible condimental medicated block which will not disintegrate, and wherein the cost of production is reduced and the efficiency increased.

Much difficulty has attended the numerous experiments which finally resulted in a composition which attained the above objects, for I found that all gritty substances had to be eliminated, and all soft and spongy material had to be so regulated in their proportions as to maintain the integrity of the block and still not sacrifice its medicinal properties.

My invention contemplates a composition in the form of a hard solid block or mass consisting of condimental and medical elements, which are digestible, intimately mixed and compressed under a very high pressure, the materials being so proportioned that the blocks will not disintegrate.

My new article in an advantageous embodiment of my invention may be made of the following ingredients, in the proportions stated, to wit:

| Ingredient | Amount | Percent |
|---|---|---|
| Capsicum | ($\frac{1}{4}$ lb.) | .25% |
| Levant worm seed | ($\frac{1}{4}$ lb.) | .25% |
| American worm seed | ($\frac{1}{4}$ lb.) | .25% |
| Calcium phosphate or carbonate | ($\frac{1}{4}$ lb.) | .25% |
| Magnesium chlorid | ($\frac{1}{4}$ lb.) | .25% |
| Gentian | ($\frac{1}{4}$ lb.) | .25% |
| Quassia | ($\frac{1}{4}$ lb.) | .25% |
| Tobacco | ($\frac{1}{4}$ lb.) | .25% |
| Charcoal | ($\frac{1}{4}$ lb.) | .25% |
| Carbonized peat | ($\frac{1}{4}$ lb.) | .25% |
| Oxid of iron | (1 lb.) | 1.00 |
| Bicarbonate of soda | (1 lb.) | 1.00 |
| Epsom salts | (1 lb.) | 1.00 |
| Sulfur | (1 lb.) | 1.00 |
| Sulfate of iron | (1 lb.) | 1.00 |
| Glaubers salts | (5 lbs.) | 5.00 |
| Pure salt | ($87\frac{1}{2}$ lbs.) | 87.5 % |
|  | 100 lbs. | 100 % |

The above ingredients are intimately mixed in any suitable manner and then subjected to a pressure of, say, seven and one-half to fifteen tons per square inch. Said pressure may be increased or diminished according to the density of the block desired. For instance where blocks are to be used under shelter, as for instance in barns or under sheds, and are not exposed to weather conditions, it is not necessary that the texture be so compact and a much lower pressure will suffice than where the block is to be used exposed to the weather, as in pastures or the like. If blocks be used in exposed places pressures nearer the higher limit mentioned are better.

When the blocks are composed and compressed as stated, they are entirely soluble and digestible and will not crack, crumble or disintegrate.

The Levant worm seed is employed in the mixture primarily on account of the presence of santonin therein, of which there is about two per cent. Therefore, santonin, 50 grains, may be substituted as the equivalent of the Levant worm seed.

It has been found that certain of the ingredients tend to cause disintegration of the block, but that this tendency is counteracted by the effect of others of the ingredients mentioned. For instance, gentian tends to disintegrate the mass, and if a larger proportion thereof is desired the Glaubers salts, or sulfate of iron, or both, if accordingly increased in proportional amount, will successfully oppose this tendency. Obviously, the proportions of those ingredients which do not tend to cause disintegration may be increased as desired.

Other medicinal ingredients than those mentioned may of course be employed and the proportion of salt in the whole mass may be greater or less. As stated, the amount of salt is usually proportioned more or less according to the amount of medicine which it is desired to administer in a given time. It is a condiment and its principal function is making the mass attractve to the animals. The bicarbonate of soda, Epsom salts, sulfate of iron, and Glaubers salts in about the proportions stated should be used. These materials severally are efficient medicinally and in the present composition they coöperate together in forming a binder. The tobacco of the composition is useful as a vermifuge. By increasing the amount the attractiveness of the composition to animals can be somewhat decreased, thereby preventing an unduly rapid consumption of the mass by animals. In other words, the salt and the tobacco have, so to speak, opposite effects in the present composition; the greater the proportion of salt present the greater being the attractiveness and the greater the proportion of tobacco, quassia, worm seed, etc., present, the less being the attractiveness. I regard my invention as comprising a medicated block formed under great pressure and consisting of a mixture of medicinal and condimental materials in balanced proportions, these materials being united and bound by various salts of medicinal property and capable of coöperating together to give a binding action. In the composition stated previously, the Glaubers salt or crystallized sulfate of sodium, contains more than half its weight of water of crystallization. The sulfate of iron and the Epsom salts also contain large amounts of water of crystallization. The bicarbonate of soda tends to act more or less on the sulfate of iron and Epsom salts under the influence of the high pressure, liberating the water of crystallization. The effect of enormous pressure on a mixture containing these materials is to give the type of bond which I desire in the present article. Due to the reaction of the bicarbonate of soda upon the sulfate of iron and subsequent oxidation, the complete block generally has a more or less yellow to red color. Other crystallized salts may be substituted for those mentioned; but those described I regard as the most efficient and the best adapted for the present purposes. The present article is substantially soluble, and is free from gritty and injurious matter.

Having thus described my invention what I claim as new, and desire to secure by Letters Patent of the United States, is,—

1. A stock block containing salts possessing water of crystallization and capable of acting under pressure to set, when pressure is removed, into a substantially solid and unit mass or block.

2. A medicated block comprising a highly compressed intimate mixture of common salt and soluble salts of medicinal value containing water of crystallization, such salts being of a nature adapted to act so as to produce a bond under heavy pressure.

3. A stock block having a major portion of common salt and a substantial remainder of condimental and medicinal elements, certain of said elements being adapted to react under compression to produce a bond binding the ingredients into a substantially unitary and solid mass or block capable of use in ordinary conditions of weather exposure without disintegration.

4. A stock block comprising over eighty per cent. of common salt and the remainder of condimental and medicinal substances, intimately mixed and compressed, said compression causing reaction between certain of the elements to produce a solid and substantially unitary mass.

5. A stock block having a major portion of stock salt and a substantial remainder of condimental and medicinal substances comprising tonic and tissue building ingredients, certain of the elements being adapted to act under compression so as to produce a bond binding the ingredients into a substantially unitary and solid mass or block.

6. A stock block having a major portion of stock salt and a substantial remainder of condimental and medicinal substances comprising iron and sulfur compounds, certain of the elements being adapted to react under compression to produce a bond binding the ingredients into a substantially unitary and solid mass or block.

7. A stock block having a major portion of stock salt and a substantial remainder of condimental and medicinal substances comprising iron, sulfur and phosphorus compounds, certain of the elements being adapted to react under compression to produce a bond binding the ingredients into a substantially unitary and solid mass or block.

8. A stock block having the major portion of stock salt and a remainder of tonic and tissue building substances, certain of said substances having a deterrent action to prevent over consumption, all of said ingredients being intimately mixed and compressed, and certain of the ingredients being adapted to produce a bond under such pressure binding the mass into a substantially solid block.

9. A stock block having a portion of stock salt and a remainder of tonic and tissue building ingredients, certain of said ingredients being capable of acting under pressure to provide a bonding action, the whole being intimately mixed and compressed into a substantially solid and unitary mass or block.

10. A stock block having a portion of stock salt and a remainder of tonic and tissue building ingredients, certain of said ingredients being capable of acting under pressure to provide a bonding action, the whole being intimately mixed and compressed into a substantially solid and unitary mass or block substantially free of any inert substances.

11. A stock block of stock salt, condimental and medicinal substances comprising tonic and tissue forming ingredients and salts, certain of said substances being capable of reaction to provide a bond, the whole being intimately mixed and formed into a solid and substantially unitary mass or block substantially free of all inert substances.

12. A stock block having the major portion of stock salt and a remainder of condimental and medicinal substances comprising vegetable and mineral ingredients, certain of said substances being capable of action to provide a bond, the whole being intimately mixed and formed into a solid and substantially unitary mass or block substantially free of all inert material.

13. As a new article of manufacture a hard, firm unitary block of salt and admixed medicaments bonded by intimately admixed hydrated salts, such salts comprising hydrated sodium sulfate and the bonding being effected by compression, said block being substantially free of inert materials.

14. As a new article of manufacture, a hard, firm, unitary highly compressed block, comprising common salt, medicaments and sufficient hydrated sodium sulfate to develop a bond under compression, the block being substantially free of inert material.

In testimony whereof, I have hereunto set my hand this 17th day of January, 1917.

GEORGE L. OWENS.